UNITED STATES PATENT OFFICE.

JAMES K. P. SHELTON, OF CUBA, ALABAMA.

COMPOSITION OF MATTER.

SPECIFICATION forming part of Letters Patent No. 657,461, dated September 4, 1900.

Application filed June 14, 1900. Serial No. 20,275. (No specimens.)

*To all whom it may concern:*

Be it known that I, JAMES K. P. SHELTON, a citizen of the United States, residing at Cuba, in the county of Sumter and State of Alabama, have invented certain new and useful Improvements in Composition of Matter; and I do declare the following to be a full, clear, and exact description of the invention, such as will enable others skilled in the art to which it appertains to make and use the same.

My invention relates to a composition of matter designed for use in the nature of a cement or protective coating for the roofs of houses, fencing, posts, and other surfaces or objects exposed to the destructive influences of the weather, the object in view being to provide a cement or protective coating which may be easily applied and is water and wind proof and to a large extent fireproof.

The invention consists of a composition of matter comprising coal, sand, and resin, ground or powdered and intimately incorporated and combined and applied to the surface of the object to be protected by the action of heat.

In carrying the invention into practice I take equal parts of coal-dust, powdered or ground sand, and powdered resin and thoroughly mix the three together. These ingredients when thus combined form the cement or protective coating, which may be packed away in sacks or barrels until occasion arises for its use.

The cement is applied to the surface of the roof or other object to be protected by sifting or sprinkling it over the same to the desired depth and fusing or melting the cement by the action of heat to cause the ingredients to adhere firmly to each other and to the surface. This latter operation is preferably carried out through the medium of a hot iron, plate, or vessel, which is held over the cement until the ingredients are thoroughly fused and combined, and the entire surface is heated in this manner to effect a thorough and uniform fusion and cohesion. An exceedingly hard and durable water and wind proof coating or covering is thus formed, which is also to a large extent fireproof. I have found that with some care and proper manipulation the operation of fusing the cement may be quickly and thoroughly effected. Leaky wooden and metallic roofs may also be readily repaired by the use of this cement.

The surface of the coating may be readily repaired in case of fracture by sifting the cement into the crack or cracks and fusing the same to the surface, as above described.

The proportions given may under certain conditions be varied without affecting the result, and hence I do not limit myself to using equal parts of the several ingredients.

Having thus described my invention, what I claim, and desire to secure by Letters Patent, is—

1. A cement or composition of matter for the purpose herein described, comprising coal, sand and resin, ground or powdered and combined, substantially as described.

2. A fusible cement or composition of matter for the purpose herein described, comprising equal parts of coal, sand and resin, ground or powdered and combined, and adapted to be fused or melted, substantially as described.

In testimony whereof I have hereunto set my hand in presence of two subscribing witnesses.

JAMES K. P. SHELTON.

Witnesses:
  H. A. TREADAWAY,
  J. W. WARD.